United States Patent Office 2,958,548
Patented Nov. 1, 1960

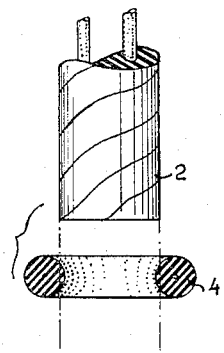
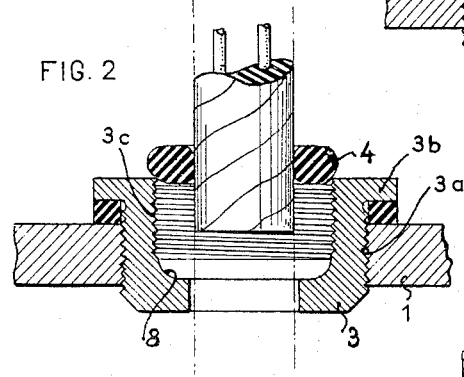
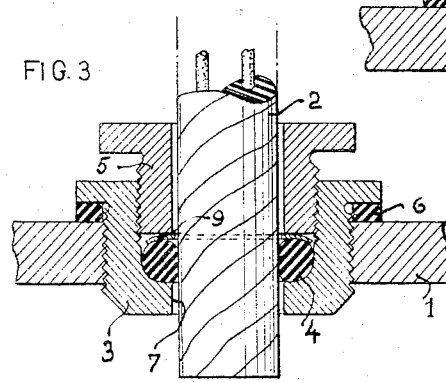
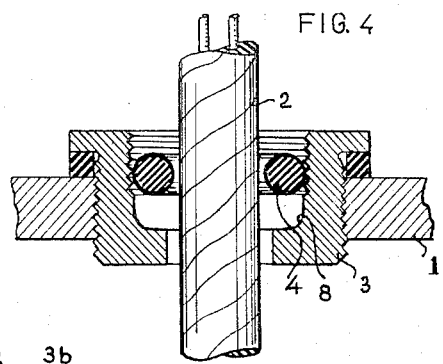
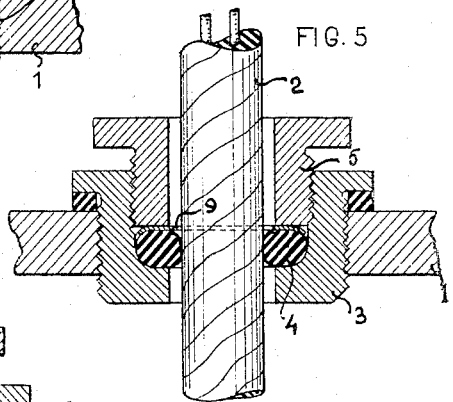

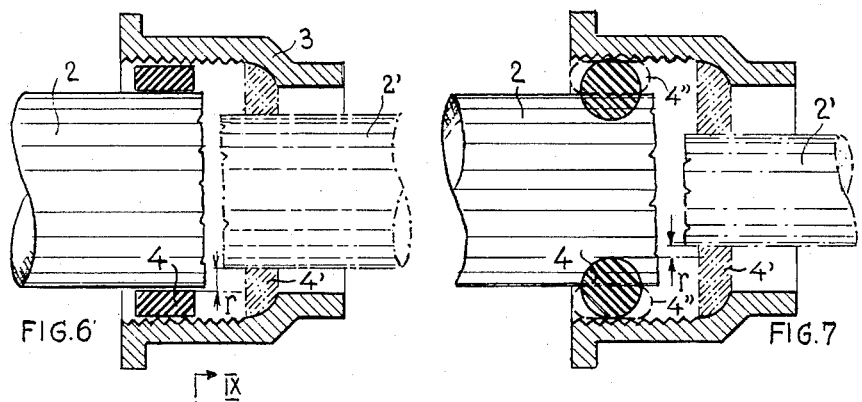
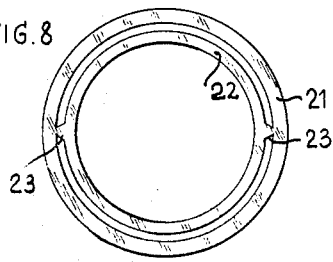 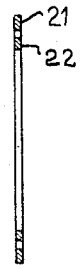 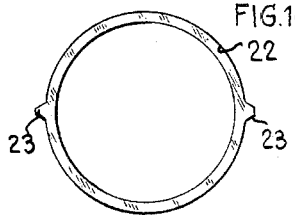
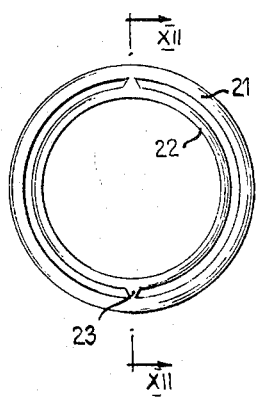 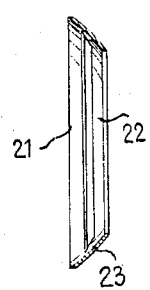 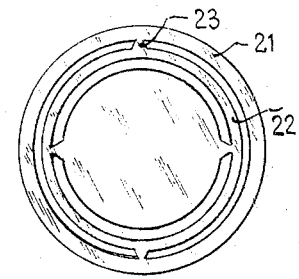

2,958,548

TIGHT GRIPPING ATTACHMENT FOR ELECTRIC CABLES AND THE LIKE

Robert Alexandre de Vienne, 8-bis Rue Laurent Pichat, Paris 16, France; Jean Paul de Vienne, 4-bis Rue Lucien Jeannin, La Garenne-Colombes, France; and Pierre Grenier, 24 Rue Ernest Renan, Colombes, France Filed May 23, 1958, Ser. No. 737,365

Claims priority, application France May 24, 1957

2 Claims. (Cl. 285—158)

This invention relates to a device for tightly securing an elongated element such as an electric cable, a braided wire or a rigid or flexible pipe in an aperture provided for this purpose.

As an example, the device to which the invention relates may be used for tightly securing a cable in an opening provided, for this purpose, in a partition.

In our prior Patent Number 2,788,992 of April 16, 1957, we have described a device of this type that comprises a ring member which is compressed between two threadably engaged metal parts and which is progressively constricted by being pressed along an inner curved surface of one of said parts, to be clamped around the elongated element to be secured.

The ring member of this prior device has, in unstressed condition, an outer diameter smaller than the inner diameter of the metal part provided with said curved surface, so that it may be freely introduced thereinto and, again in unstressed condition, its internal diameter is greater than the maximum diameter of the elongated element to be accommodated.

Now, the minimum diameter of the range of elongated members which may be gripped in an attachment of this type is obviously defined by the maximum possible reduction of the ring inner diameter from its value in unstressed condition, so that in our said prior device the said minimum diameter only differs from the maximum one by said possible reduction. As for said maximum diameter, it corresponds to the narrowest passage offered to the elongated element through the attachment.

An object of this invention is to provide a tight gripping attachment of the same general type as that described in the above mentioned patent, but which insures tight gripping of elongated members having a wider range of diameters, without any modification of its metal parts.

Another object of our invention is to improve the gripping action of our attachments, in particular for the biggest elongated elements of the range.

Still another object of our invention is to facilitate the introduction of the ring member into the attachment, as well as that of the elongated member into the ring member, in particular when there is but a narrow annular space left between the attachment and the elongated member.

According to the invention, there is used a ring member of toric shape or the like, having capacity for rolling movement on the cable as well as in the attachment, the outer diameter of the said ring member, in unstressed condition, being substantially equal to the inner diameter of the metal part provided with the curved surface while its inner diameter, again in unstressed condition, is materially smaller than the maximum diameter of the elongated element to be gripped.

In this novel attachment, the maximum possible reduction of the inner diameter is the same as in our prior device but, since it starts from a smaller value, it also reaches a smaller value, which reduces the lower limit of the range of adaptability of the attachment to elongated elements of various diameters.

As for the upper limit, it remains unchanged (this limit is defined as previously by the attachment bore) since the rolling capacity of the ring member permits threading the biggest elongated elements of the range therethrough with the greatest facility.

Moreover, except for the smallest elongated elements, this introduction of the elongated element into the ring member also increases the outer diameter thereof. Again, owing to its rolling capacity, the ring member can be nevertheless easily introduced into the metal part, and this offers the further advantage that the ring member is, so to speak, pre-compressed between the attachment and the elongated member even before engaging of the metal parts with one another, which increases the gripping power of the attachment.

Still a further object of our invention is to provide each attachment with a composite washer comprising a plurality of easily detachable concentric elements, which permits of obtaining at will a more or less wide annular metal part to be interposed between the more or less flattened ring member and the threaded metal part that causes this flattening.

Other objects and advantages of the invention will be apparent from the following detailed description, together with the accompanying drawings submitted for purpose of illustrations only and not intended to limit the scope of the invention, reference being had for that purpose to the sub-joined claims.

In these drawings:

Figs. 1, 2 and 3 are axial sectional views showing the successive steps of the introduction of a big cable into a tight gripping attachment according to the invention.

Figs. 4 and 5 are similar views, showing a cable of smaller size clamped in the same attachment.

Figs. 6 and 7 are comparative diagrammatic views illustrating the gain of diameter range obtained with the attachment according to the invention as compared with the prior attachments mentioned in the preamble.

Fig. 8 is a top view of a composite washer to be used with an attachment according to the invention.

Fig. 9 is a sectional view along line IX—IX of Fig. 8.

Fig. 10 is a top view of the inner element of the washer shown in Fig. 8 once detached therefrom.

Fig. 11 is a top view of an embossed composite washer of similar design.

Fig. 12 is a sectional view along line XII—XII of Fig. 11.

Fig. 13 shows a modification in which the central portion of the washer is originally attached to the same.

Referring first to Figs. 1 to 3, there is shown at 1 a wall, for instance of a casing provided with a hole in which a cable 2 is to be secured tightly. For this purpose, there is used a tight gripping attachment according to the invention which essentially comprises a socket member 3, a ring member 4 and a ferrule 5.

The socket member 3 is provided with an outer threading 3a engaged in the correspondingly threaded hole of the wall 1, a packing ring 6 being interposed between an outer flange 3b of the socket member 3 and the outer face of the wall 1.

The socket member 3 is provided with a bore 7 having a diameter substantially equal to the maximum size of cable to be gripped. The bottom of the socket member 3 is provided with a curved surface 8 as described in our prior patent, which is intended to insure constriction of the ring member 4 as the ferrule 5 is screwed home.

In the example shown, the said curved surface is concave but it could be convex as well, as described in said prior patent, or it could have any other suitable shape, provided that it be capable of insuring the desired constriction.

The ring member 4 is made of a plastic and/or elastic material such as rubber. The shape of the ring member may be varied at will within the scope of the invention provided that it be capable of rolling along a cable of bigger size than its inner diameter in unstressed condition, as well as along the threaded cylindrical portion 3c of the bore of the socket member 3, which cylindrical portion smoothly merges into the inner curved portion 8.

In unstressed condition, the ring member 4 has an outer diameter substantially equal to, but preferably slightly smaller than the inner diameter of the cylindrical threaded portion 3c, so that when cables of comparatively small diameter such as that shown in Fig. 4 are mounted in the attachment, the ring member 4 may be easily introduced into the said bore in the manner described in our previously cited prior patent.

In the example shown, the shape of the ring member 4 is that of a tore. But whatever may be its shape, under the conditions defined above, its axial length should be greater than that of the constricted wall portion, so that even with the smallest cables of the range, a sufficient constriction of the ring member can be insured by screwing home the ferrule 5.

Now, according to the invention, the inner diameter in unstressed conditoin of the ring member 4 is smaller than the maximum diameter of the cable to be accommodated as shown in Fig. 1, so that when the cable 2 is threaded into the ring member 4, which is made possible by the rolling capacity of the said ring member, the outer diameter of the latter becomes greater than the diameter of the bore 3c, as shown in Fig. 2.

Under these conditions, the introductoin of the ring member 4 already mounted on the cable 2 into the bore 3c takes place easily under rolling of the said ring member both along the cable 2 and along the bore 3c, as the cable 2 is displaced downwardly from the position shown in Fig. 2 with respect to the socket member 3. This gives rise to a compression of the ring member 4 between the cable and the bore, which causes not only a pre-compression of the ring member which is highly favorable to its subsequent gripping action but also an increase of its axial length, which also favors the ulterior clamping action of the ferrule 5.

Once the ring member 4 has reached the top of the curved surface of the socket member 3, a washer 9, preferably of the type described hereafter with reference to Figs. 8 to 13, is put thereon and the ferrule 5 is screwed home which causes axial compression of the ring member 4, thus further increasing the gripping pressure of the said ring member around the cable 2.

Briefly, the ring member 4 has been first pre-compressed when forcibly introduced into the annular space between the cable and the bore is described above, then further compressed under the constricting action of the curved surface 8 and, finally, still further compressed by the crushing action of the ferrule 5.

It is clear that, for assembling the parts, it is necessary to pass around the cable 2, first of all the ferrule 5, then the washer 9 and finally the ring member 4, before introducing the free end of the cable through the attachment 3.

In the embodiment shown, the washer 9 is concave and its concavity is turned towards the ring member 4 so that it is automatically centered thereon and so that its outer edge cannot be jammed in the threads of the bore 3c as the ferrule 5 is screwed down.

In the case of cables of smaller diameter, as shown in Figs. 4 and 5, the ring member 4 is freely introduced into the bore (Fig. 4) down to the upper end of the curved portion 8. When the ferrule 5 is screwed home the ring member 4 is constricted as previously as it slides down to the bottom of the curved portion 8 and then, compressed axially by the ferrule 5 which still tends to increase its constriction.

In the comparative views of Figures 6 and 7, the ring member is shown at 4 as previously contemplated; 2 is the cable and 3 is the socket member. The other parts of the attachment have been omitted in these figures to facilitate the comparison. The full line sketch corresponds, in both figures, to the case of a cable of maximum diameter within the possible range while the sketch in dot-dash line shows the case of the minimum diameter. It may be seen that with our prior attachment shown in Fig. 6, the inner diameter of the ring member 4 in unstressed condition is substantially equal to the maximum diameter of the cable 2, so that even if it undergoes its maximum possible reduction of inner diameter $r$ (to assume the shape shown in dot-dash line at 4') the ring member cannot securely clamp cables having a diameter lower than that shown in dot-dash line at 2'.

In contradistinction therewith, the ring member 4 according to the invention, Fig. 7, after having undergone the same reduction $r$ to assume the shape 4' can still tightly grip cables down to that shown in dot-dash line at 2', i.e. having a far smaller diameter than in the case of the prior attachment. The dotted profile of Fig. 7 shows the shape of the ring member 4 when pre-compressed between a cable 2 of maximum diameter and the socket member 3. As a specific example, it may be worth mentioning that a rectangular ring member, according to our prior patent, having respectively outer and inner diameters of 24 and 20 mm. permits tightly securing cables comprised within a range of 24 to 20 mm. only while a toric ring member according to the invention having 24 and 17 mm. of outer and inner diameters respectively permits tightly gripping cables ranging from 24 to 12 mm.

The washer 9 is preferably designed as shown in Figs. 8 to 13.

Referring first to Figs. 8 and 9, there is shown a washer constituted by two concentric annular portions 21 and 22 interconnected solely by means of destructible lugs. In the example shown there are two lugs 23 which are diametrically opposed. These lugs have a trapezoidal shape, the small base of which is located on the inner circumference of the outer portion 21, while its greater base is located on the outer circumference of the inner portion 22. Since the plate in which the washer is cut has a constant thickness, the small base of the trapezoidal lug constitutes an area of lesser resistance which will easily yield to cause separation between the two concentric portions along the inner circumference of the outer one. The composite washer shown in Fig. 8 may be used as such: its outer diameter is then equal to that of the outer portion 21 and its inner diameter to that of the inner portion 22.

Now, if the inner portion 22 is twisted around the diameter passing through the lugs 23, the above mentioned area of lesser resistance is torn away and there is obtained a new washer having the same outer diameter as previously but of which the inner diameter is now equal to that of the outer portion. The lugs 23 remain attached to the inner portion 22 (Fig. 10) which is to be thrown away.

It is obvious that such a composite washer may include more than two concentric annular portions connected by a suitable number of destructible lugs.

In Figs. 11 and 12 is shown an alternative embodiment which only differs from the preceding one in that the washer instead of being flat is embossed in the shape of a frustum of a cone. The same references as in Figs. 8 to 10 have been used for the parts of this washer.

Finally in Fig. 13 is shown another construction in which the central portion of the plate from which the washer is cut has been kept to be used, if required, in certain particular applications.

It is clear that when an attachment according to the invention is provided with a composite washer of the above described type, it is easy to detach before use, if required, one or more annular portions so as to obtain an annular metal member of suitable area adapted to be interposed between the ferrule 5 and the ring member 4 whatever may be the degree of constriction of the latter; i.e. whatever may be the diameter of the elongated element gripped in the attachment within the range afforded.

What we claim is:

1. A device for attaching to a member having an aperture therein an elongated element the external diameter of which lies within determinable limits, said device comprising a socket member adapted to be secured in said aperture and including an internally threaded cylindrical wall portion and a constricted wall portion extending from the threaded wall portion, the constricted portion terminating in an inturned radial shoulder provided with an opening to accommodate the passage of said elongated element through said socket member, an elastically deformable gripping ring member of substantially circular section axially displaceable in said socket member, a ferrule threadably engageable with said cylindrical wall portion to move said ring member along said constricted wall portion toward said radial shoulder, and a washer member interposed between said ring member and said ferrule, said washer having an initial internal diameter which is smaller than the diameter of said opening, said washer member including concentric annular portions and pairs of lugs detachably connecting adjacent pairs of said annular portions and defining between each of said adjacent pairs slots of substantially 180° extent, said ring member having, in unstressed condition, an external diameter smaller than the internal diameter of said cylindrical wall portion and an internal diameter smaller than the initial internal diameter of said washer member.

2. A device as claimed in claim 1, wherein said lugs are of trapezoidal shape and taper towards the outer of the annular portions.

References Cited in the file of this patent

UNITED STATES PATENTS

| | | |
|---|---|---|
| D. 21,194 | Chisholm | Dec. 1, 1891 |
| 2,560,263 | Wiegand | July 10, 1951 |
| 2,788,992 | DeVienne | Apr. 16, 1957 |
| 2,797,109 | Conrad | June 25, 1957 |

FOREIGN PATENTS

| | | |
|---|---|---|
| 336,850 | Germany | July 9, 1920 |
| 67,329 | Sweden | Nov. 12, 1926 |
| 855,651 | France | Feb. 19, 1940 |